United States Patent [19]
Armstrong

[11] 4,355,478
[45] Oct. 26, 1982

[54] METHOD FOR MAKING FRAMED STRUCTURES

[76] Inventor: Joe W. Armstrong, 1229 E. Highland, Phoenix, Ariz. 85014

[21] Appl. No.: 160,977

[22] Filed: Jun. 19, 1980

[51] Int. Cl.³ .......................... E06B 3/26; B23B 3/26; E06B 7/16; B32B 3/26
[52] U.S. Cl. ......................................... 40/154; 40/616; 72/215; 72/69; 160/380; 160/395; 428/122
[58] Field of Search .................. 113/116 HA; 72/215, 72/216, 217, 218, 219, 178, 458; 428/122, 45; 40/616, 154, 549, 152; 156/216, 217; 29/DIG. 3, 402.21, DIG. 24, DIG. 15, 423, 400 D, 20; 140/81.5, 92.1, 92.2; 273/73 H; 434/81, 88; 160/369, 380, 395

[56] References Cited
U.S. PATENT DOCUMENTS

| | | | |
|---|---|---|---|
| 639,221 | 12/1899 | Filstrip et al. | 72/215 |
| 2,108,271 | 2/1938 | Samuel | 72/215 |
| 2,141,824 | 12/1938 | Ranger | 273/73 H |
| 2,142,443 | 1/1939 | Goin | 72/215 |
| 2,190,611 | 2/1940 | Sembdner | 29/DIG. 3 |
| 2,595,833 | 5/1952 | Flaherty | 160/369 |
| 2,834,412 | 5/1958 | Velke | 160/395 |
| 3,077,907 | 2/1963 | Gottlieb | 29/DIG. 3 |
| 3,814,423 | 6/1974 | Shockley | 273/73 H |
| 3,885,333 | 5/1975 | Zachary | 160/380 |
| 4,150,279 | 4/1979 | Metcalfe | 72/69 |
| 4,189,880 | 2/1980 | Ballin | 160/380 |
| 4,214,036 | 7/1980 | Bright | 428/122 |
| 4,252,847 | 2/1981 | DelGrande | 428/45 |

*Primary Examiner*—Robert Peshock
*Assistant Examiner*—Michael J. Foycik, Jr.
*Attorney, Agent, or Firm*—Herbert E. Haynes, Jr.

[57] ABSTRACT

A method for making an irregularly configured endless metal frame and fixedly attaching a sheet of flexible material thereto.

9 Claims, 10 Drawing Figures

U.S. Patent   Oct. 26, 1982   Sheet 1 of 2   4,355,478
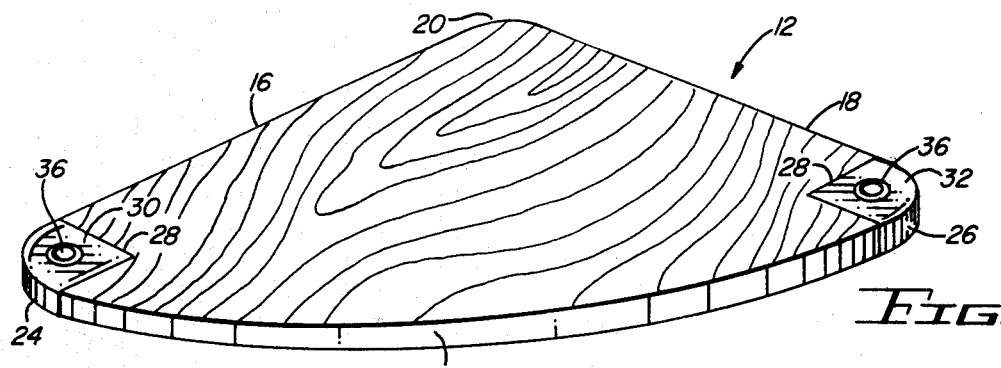
FIG. 1
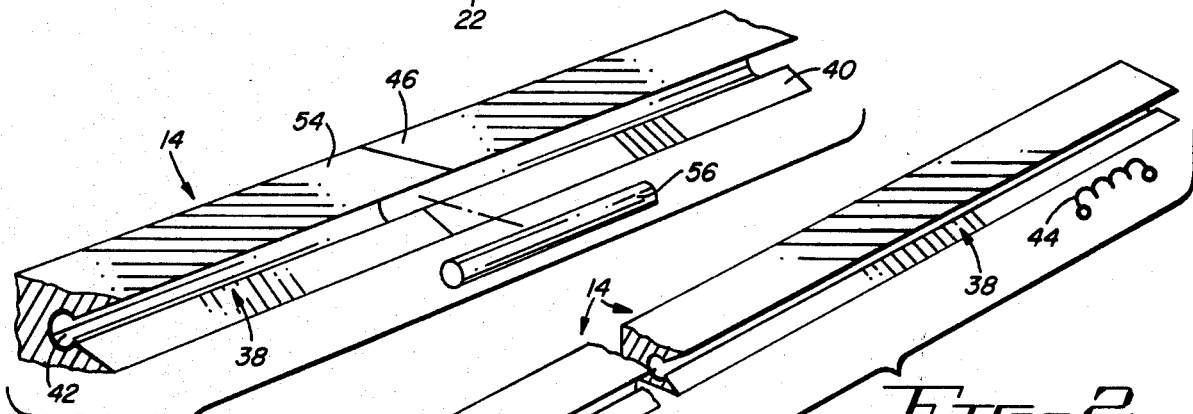
FIG. 2
FIG. 4
FIG. 5
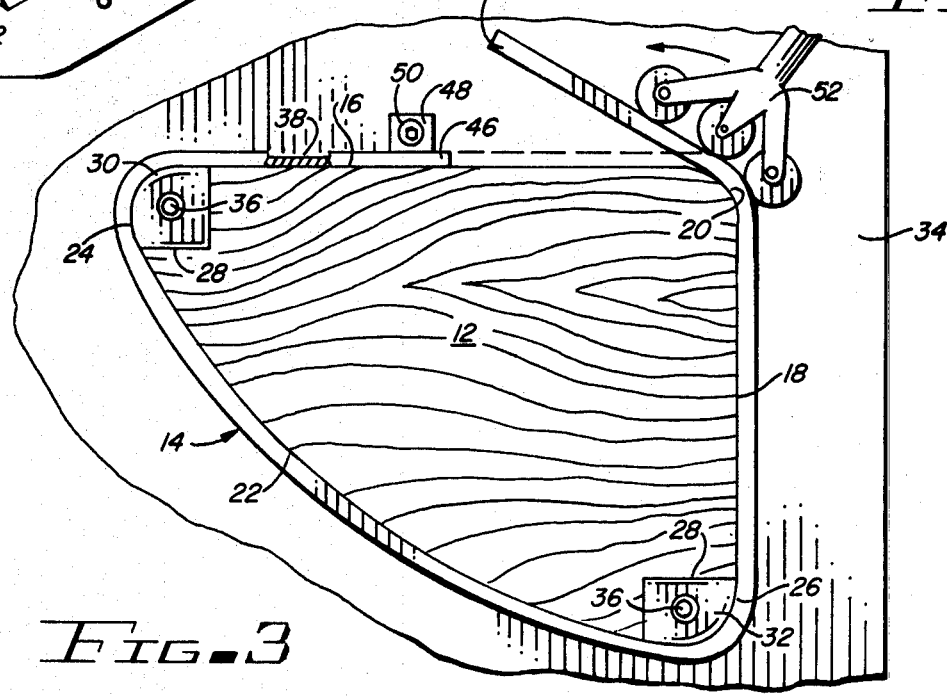
FIG. 3

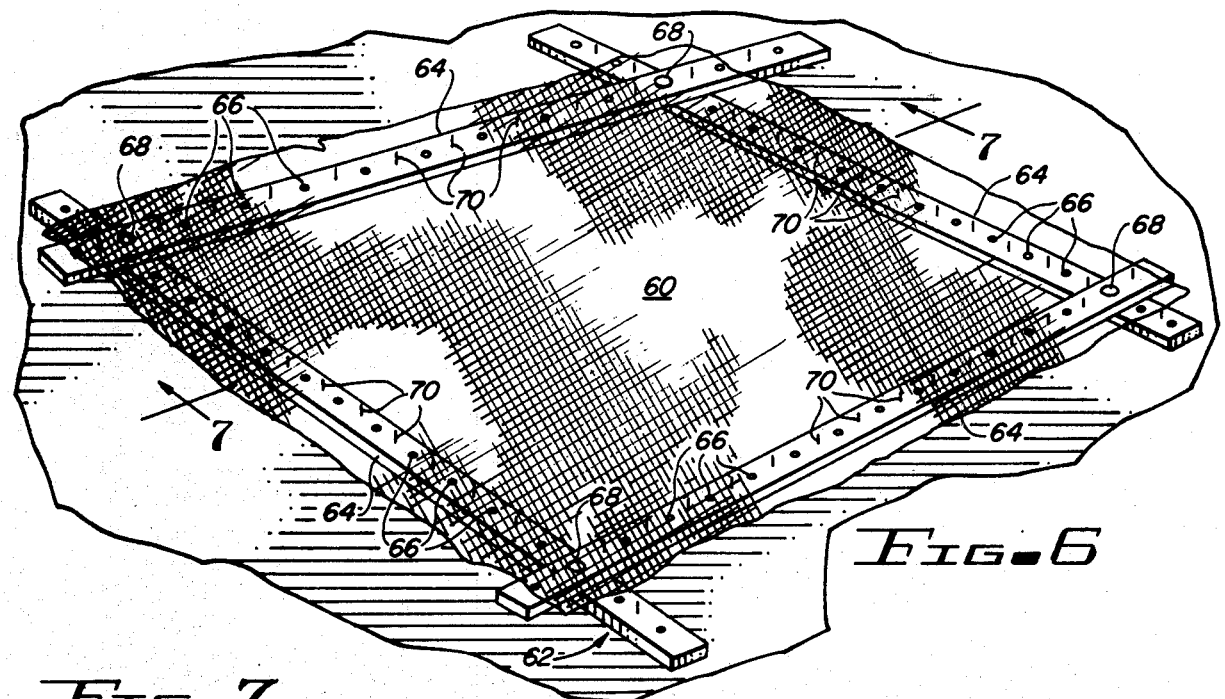
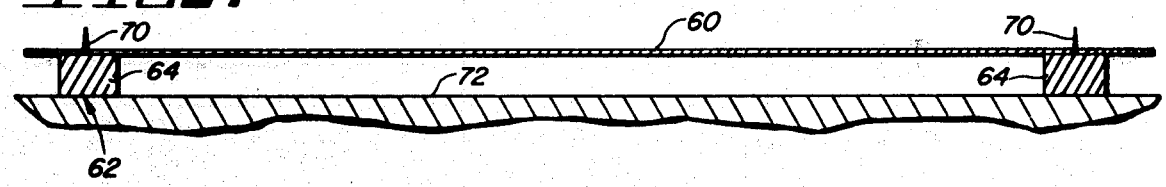
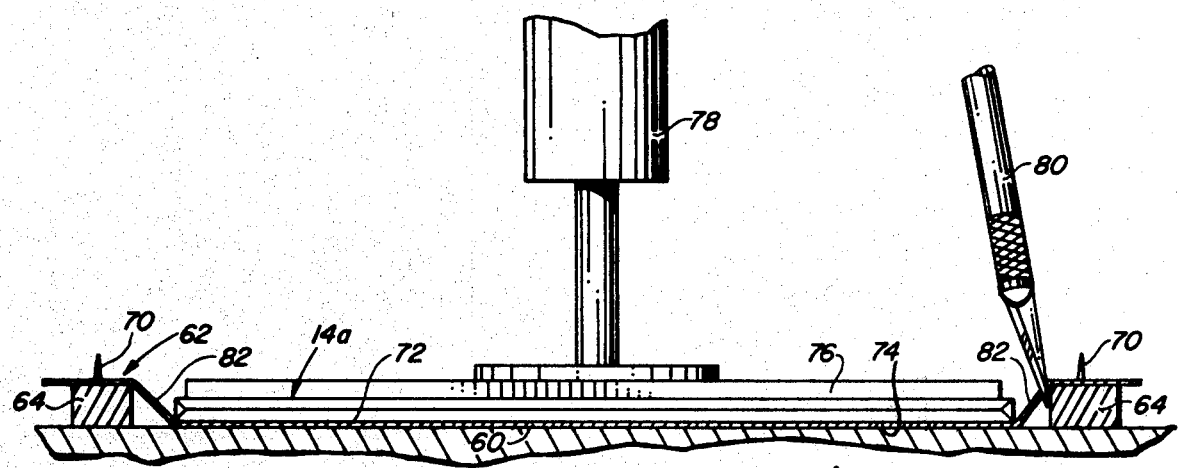
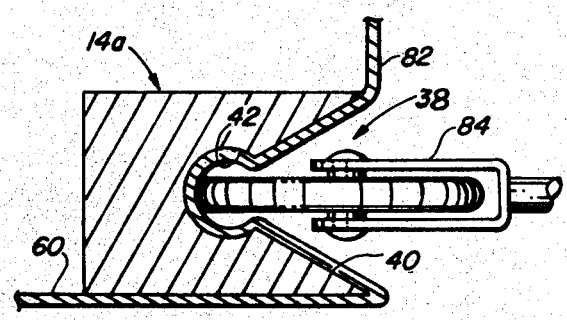
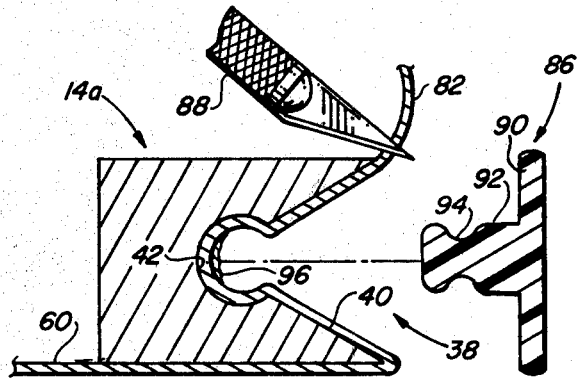

METHOD FOR MAKING FRAMED STRUCTURES

BACKGROUND OF THE INVENTION

1. Field of the Invention

This invention relates in general to framed structures and more particularly to a method for making framed structures of irregular or free-form configuration.

2. Description of the Prior Art

Metallic frame structures have long been used for holdingly supporting flexible sheet materials such as wire mesh screens, woven fabric screens, plastic films and the like, with examples of typical products being the well known mesh window and door screens.

Products of this sort normally use metallic framing elements in the form of elongated channels having longitudinal grooves for receiving the edges of the sheet material which is wedgingly held therein by spline members. The channels are cut to the proper size and are formed with mitered ends, and the framing elements are joined such as by welding or by suitable fasteners such as brackets and screws.

The products manufactured by this or similar techniques, are of rectilinear configurations such as square, rectangular, and the like.

A special application for products of this sort, which has become increasingly popular in recent years particularly in warm climates, is that of mounting a solar reflective screen, or film, in a metal frame for use in the windows of automotive vehicles. In some cases, such as the rear window of pickup trucks, the window is of substantially rectilinear configuration and the above described manufacturing technique is used in such cases. However, the irregularly shaped side windows of many of today's automotive vehicles is another matter entirely.

Forming metal framed structures of this sort in irregular or free-form shapes, is something which has been avoided for the most part in all but custom and special application work due to manufacturing problems which result when metallic framing channels are bent into non-rectilinear shapes. Unless special precautions are taken, bending of the channels will result in channel distortion which not only produces an unsightly product but also distorts the material holding groove of the channel to where it will no longer receive and/or hold the edges of the sheet material.

Of course, the channel distortion problem could be overcome by fabricating metal dies of the desired irregular shapes. However, the cost of such dies and the equipment needed for their use makes it economically impractical to use this technique in all but very high production runs. In the above mentioned special automotive application, this technique is not feasible due to the high costs and due to the great variety of irregularly shaped windows of the different automotive makes and body styles.

Two techniques have been employed in prior art attempts to solve the irregular window shape problem in the special automotive application mentioned above. The first of these prior art techniques involves the cutting of the solar reflective material into a substantially rectilinear shape and mounting the material on a spring loaded pole shade roller and then mounting it above the irregularly shaped window. This technique avoids the use of a metal frame altogether, but it is not a completely satisfactory solution due to the unsightliness and poor fitting of the mounted product, motion induced swinging, and wind induced flapping of the solar reflective material.

The second, and most often used prior art technique, involves the cutting of notches in metal channels at the locations which are to be bent into the desired irregular shape. This technique is time consuming and the resulting product is unsightly and considerably weakened to the point where cross bracing is needed, almost without exception, to provide the necessary rigidity in the finished product. The costs involved for channel notching and cross bracing, along with the inherent unsightliness of the notched channels and the cross braces, makes these products less than the desired solution to the problem.

Therefore, a need exists for a new and improved method for making irregularly shaped metal frames for holdingly supporting flexible sheet materials.

SUMMARY OF THE INVENTION

In accordance with the present invention, a new and improved method for making irregularly configured metal framed sheet material products is disclosed.

The method of the present invention includes the making of an inexpensive pattern, such as of wood, with the pattern having a peripheral configuration which matches the irregular shape of the desired end product, such as an irregularly shaped window of an automotive vehicle. An elongated metallic channel having a groove extending longitudinally in one surface thereof is sized to have a length which is equal to the periphery of the pattern. The sized framing channel is heated at predetermined locations along its length and pressed into conformity with the periphery of the pattern, with the groove of the metal channel facing outwardly, and the opposite ends of the channel being adjacent to each other. This operation inexpensively produces an irregularly configured metal framing channel which is distortion free. The opposite ends of the framing channels are then connected to each other to form an endless metal frame of the desired irregular configuration.

The flexible sheet material is placed in a variably configurable holding fixture which grips the edges of the material to hold it in a substantially planar attitude. The endless metal frame is placed on the material and pressed into deflecting engagement therewith to draw the material taut. With the material held taut by the endless frame, the extending, or protruding edges of the material are released from the holding fixture and inserted into the outwardly facing endless groove of the metal frame. Then an elongated spline is wedgingly inserted into the frame's groove to fixedly hold the edges of the sheet material therein and this operation is followed by trimming of the excess sheet material to complete fabrication of the irregularly configured metal frame flexible sheet material.

Accordingly, it is an object of the present invention to provide a new and improved method for making metal framing members.

Another object of the present invention is to provide a new and improved method for making metal framed sheet material products.

Another object of the present invention is to provide a new and improved method for making metal framed sheet material products of irregular or free-form configuration.

Another object of the present invention is to provide a new and improved method for making irregularly shaped metal frames and mounting flexible sheet material therein.

Another object of the present invention is to provide a new and improved method for making metal framed sheet materials of irregular or free-form configuration, with the method being particularly well suited for making window shading products for use in irregularly shaped windows of automotive vehicles.

Another object of the present invention is to provide a new and improved method for making metal framed sheet material products of irregular or free-form configuration with the method being inexpensive to accomplish and resulting in aesthetically appealing well fitting finished products which are structurally sound without the need for cross bracing.

Another object of the present invention is to provide a new and improved method of the above described character wherein an elongated metal channel is formed into a desired endless distortion free irregular configuration by heating the channel at predetermined locations and pressing it into conformity with a low cost pattern of the desired shape and interconnecting the opposite ends thereof.

Another object of the present invention is to provide a new and improved method of the above described character wherein the irregularly configured endless metal frame is pressed into deflecting engagement with a sheet of flexible material to hold that material taut while its edges are fixedly inserted into an endless groove formed in the outwardly facing peripheral edge of the endless metal frame.

The foregoing and other objects of the present invention, as well as the invention itself, will be more fully understood from the following description when read in conjunction with the accompanying drawings.

BRIEF DESCRIPTION OF THE DRAWINGS

FIG. 1 is a perspective view of a typical irregularly shaped pattern suitable for use in the method of the present invention.

FIG. 2 is a fragmentary perspective view illustrating an elongated metal channel being heated at predetermined locations along its length.

FIG. 3 is a plan view of the heated metal channel being pressed into conformity with the periphery of the irregularly shaped pattern.

FIG. 4 is a fragmentary perspective view illustrating one way in which the opposite ends of the irregularly configured metal channel may be connected to each other to form an endless metal frame.

FIG. 5 is a cross sectional view of the endless metal frame illustrating the optional step of placing an adhesive in the endless groove formed in the outwardly facing peripheral surface of the metal frame.

FIG. 6 is a perspective view of a variably configurable fixture for gripping the edges of a flexible sheet of material and supporting the sheet in a planar attitude.

FIG. 7 is a sectional view taken on the line 7—7 of FIG. 6.

FIG. 8 is a view similar to FIG. 7 and showing the endless irregularly configured metal frame being pressed into deflecting engagement with the sheet material held in the supporting fixture and also showing the extending edges of the material being freed from the supporting fixture.

FIG. 9 is an enlarged cross sectional view showing the extending material edges being inserted into the endless groove of the metal frame.

FIG. 10 is a view similar to FIG. 9 and showing a spline being wedgingly inserted into the endless groove of the metal frame to fixedly hold the edges of the sheet material therein and also showing the final step of trimming the excess material.

DESCRIPTION OF THE PREFERRED EMBODIMENT

Referring more particularly to the drawings which illustrate the various steps of the method of the present invention, and the various tools and implements used in the practice of the invention.

FIG. 1 illustrates a typical pattern 12 for use in bending an elongated metal channel 14, of the type shown best in FIGS. 2 and 3, into endless irregular, or free-form, configurations as will hereinafter be described in detail. For economic reasons, which will become apparent as this description progresses, the pattern body is preferably formed of a planar sheet of good quality plywood such as the type commonly referred to as a lumber core plywood, or the equivalent. The pattern body is cut into the desired irregular configuration which in the example shown in FIG. 1 includes a first substantially straight edge 16, a second substantially straight edge 18 in right angle relationship with respect to the first edge with a radiused corner 20 between those edges. A third edge 22 of arcuate shape completes the peripheral configuration of the pattern 12 and is seen to form an acute angle corner 24 where it joins the first edge 16 and an acute angle corner 26 where it joins the second edge 18. The acute angle corners 24 and 26 of the typical pattern 12 are notched or cut away as shown at 28, and metal corner pieces 30 and 32 are inserted respectively into the cut away corners 24 and 26.

The insertable metal corners 30 and 32 serve two purposes with the first being to anchor the pattern 12 to a supporting structure such as the table top 34 shown in FIG. 4. Each of the insertable metal corner pieces are provided with a suitable aperture for receiving a threaded fastener 36 by which the metal corners, and thus the pattern 12, are threadingly secured to the supporting surface. The second purpose for the insertable metal corners 30 and 32, is to withstand the forces applied when the channel member 14 is bent around those corners in the manner to be hereinafter described.

It has been found that the channel member 14, when formed of the preferred material of aluminum, and prepared in accordance with the method of the present invention, may be bent into conformity with arcuate surfaces, such as the edge 22 of the pattern 12, without exerting forces that would damage the pattern 12. It has also been found that the forces exerted in bending the channel member into obtuse and right-angle corners such as the corner 20, will not damage the pattern as long as such corners have a comparatively large radius. However, acute angle corners such as 24 and 26 of the pattern 12 may be damaged by the bending forces, and the insertable metal corners 30 and 32 prevent such damage.

It will be appreciated that the patterns employed in the method of the present invention require at least two anchoring means which are located on substantially opposite sides of the pattern, and that the insertable metal corners are an ideal way of accomplishing such anchoring. It will be appreciated that the illustrated metal corners 30 and 32 may be used in conjunction with a variety of different pattern bodies, such as one similar to the illustrated pattern 12 but having a different arcuate curvature of the edge 22.

The illustrated and above described pattern 12 is ideally suited for somewhat limited production runs and will be completely satisfactory for most purposes. The useful life of the pattern 12 may be extended by attaching a metal band (not shown) on the edges to reduce wear of those edges.

As hereinbefore mentioned, the elongated metal channel 14 is preferably formed of aluminum, however, other metals may be used. As shown, the metal channel 14 is of substantially rectangular cross section with a groove 38 formed to extend along one of the longitudinal surfaces of the channel. The groove 38 is formed with a V-shaped trough 40 which has its converging end in communication with an enlarged passage 42. The preferred configuration of the passage 42 is circular in cross section so that the trough 40 and the passage 42 intersect in a manner so that the circular passage is more than semicircular in cross section, but is less than completely circular. The purpose for this configuration of the groove 38 will become apparent as this description progresses.

To facilitate bending of the elongated metal channel 14 around the corners 20, 24 and 26 of the pattern 12, the channel is heated at locations along the length thereof at which such bending will occur. This step of the method of the present invention is illustrated in FIG. 2 which schematically shows plural heater means 44 being used for this purpose.

The heated channel 14 is then placed on the supporting surface 34 (FIG. 3) so that one of its ends 46 is located at approximately the midpoint of the first edge 16 of the pattern 12, with the groove 38 of the channel facing outwardly of the pattern. The end 46 of the channel is anchored in bearing engagement with the edge 16 of the pattern by a suitable anchoring means 48 which is demountably secured to the supporting surface 34 in any suitable manner, such as by means of a threaded fastener 50. The channel 14 is then pressed into conformity with the peripheral surface of the pattern 12, and this is shown as being accomplished by a multi-roller tool 52. This channel pressing operation may be accomplished by placing the roller tool 52 in bearing engagement with the channel adjacent the anchored end 46 thereof and moving it along the length of the channel about the pattern 12 as shown. Alternately, the multi-roller tool 52 may be held in one location and the supporting surface 34 revolved. In any event, the multi-roller tool 52 is a power operated device, such as hydraulic (not shown), which exerts a force on the channel to press it into conformity with the pattern 12 and bring the other end 54 of the channel 14 into abutting engagement with the anchored end 46.

The abutting ends 46 and 54 of the channel are then interconnected in any suitable manner such as by pressing a roll pin 56, or dowel, into the circular passage 42 in the manner shown in FIG. 4. Of course, other interconnecting techniques may be employed such as welding (not shown).

When the channel 14 is formed in the above described manner and its abutting ends are interconnected, the result is an endless metal frame of irregular configuration with an endless groove formed in its outwardly facing surface, and this structure is identified in its entirety by the reference numeral 14a as seen in FIG. 8.

Referring now to FIGS. 6 and 7 wherein a sheet of flexible material 60, such as a wire mesh screen, woven fabric screen, solar reflective screening, and the like, is shown as being held in a variably configurable holding fixture 62. The holding fixture 62 is provided with a plurality of arms 64 each of which is provided with incrementally spaced apertures 66 along its length. By arranging the arms 64 in a desired relationship with respect to each other, and placing pins 68 in the aligned apertures, the arms may be configured in various rectilinear configurations which approximately match the irregular shape of the endless metal frame 14a. In addition to the incrementally spaced apertures 66, each of the arms 64 is provided with a plurality of incrementally spaced upstanding pins 70 by which the edges of the sheet material 60 is attached to the holding fixture 62. In this manner, the sheet material is cut so that it is slightly larger than the holding fixture 62 and is attached thereto to hold the material in a somewhat taut or stretched condition and in a planar attitude.

As shown in FIG. 7, the holding fixtue 62 is placed on a suitable supporting surface 72 which positions the sheet material 60 in upwardly spaced overlaying relationship with respect to the supporting surface.

The endless metal frame 14a is then placed atop the sheet material 60 in the manner shown in FIG. 8 so that the downwardly facing surface 74 of the metal frame is in juxtaposed bearing contiguous engagement with the upwardly facing surface of the sheet material. A bearing member 76 is then placed atop the endless metal frame 14a, and the sheet material 60, the metal frame 14a, and the bearing member 76 are then pressed downwardly to bring the sheet material into contiguous engagement with the supporting surface 72, and such force is exerted by means of a linear actuator 78 which is illustrated in the form of a hydraulic ram. This step draws the flexible sheet material 60 taut.

With the bearing member 76 and the metal frame 14a forcefully holding the sheet material 60 in bearing engagement with the supporting surface 72, the protruding edges 82 of the sheet material 60 are then released from the holding fixture 62 such as by cutting with a suitable tool 80 as shown in FIG. 8 and the holding fixture may then be removed to provide access to the protruding edges 82 of the sheet material 60.

As shown in FIG. 9, the protruding edges 82 of the flexible sheet material 60 are then moved upwardly into proximity with the outwardly facing peripheral surface of the endless metal frame 14a and are pressingly inserted into the endless groove 38 of the frame with any suitable tool 84 such as the roller shown.

An elongated spline 86 is then wedgingly inserted into the groove 38 atop the inserted edges 82 of the sheet material 60 to fixedly secure those edges therein, and the excess sheet material 60 is trimmed in the manner shown in FIG. 10, such as by using a suitable knife 88.

The spline 86 may be formed of any suitable material, such as plastic, rubber, and the like, which is capable of being longitudinally bent into conformity with the peripheral configuration of the endless metal frame 14a, and which is resilient to the extent that it can be wedgingly inserted in an interference fit manner in the circular passage 42 of the groove 38. The preferred configuration of the spline is of substantially T-shaped cross section with an elongated planar surface portion 90 from one surface of which an elongated rib 92 normally extends. The planar surface portion 90 has a width dimension which substantially matches the width dimension of the metal frame 14a so that when the spline is installed, the outwardly facing surface of the completed metal framed sheet material product will display a clean appearance. The rib 92 is formed with an annular groove 94 adjacent its free end to allow sufficient deformation of its free end so that it will snap into the circular passage 42 of the groove 38 and resist displacement.

An optional step in the method of the present invention is illustrated in FIG. 5, wherein a suitable adhesive 96 is shown as being inserted in the circular passage 42 of the metal frame 14a prior to insertion of the sheet material edges 82 therein. The adhesive 96 aids in holding the material edges 82 in the groove 38 prior to insertion of the spline 86 therein and upon curing will fixedly secure the spline in place.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A method for making a rigid irregularly shaped metal frame and attaching a flexible sheet of material thereto, said method comprising the steps of:
   (a) forming a planar pattern with a desired irregular peripheral configuration;
   (b) sizing an elongated metal channel so that its length is equal to the peripheral dimension of said pattern, said metal channel having a groove extending along one of its longitudinal surfaces;
   (c) heating said channel at predetermined locations along the length thereof;
   (d) pressing said metal channel into demountable conformity with the irregular periphery of said pattern to bring the opposite ends of said channel into abutting engagement with each other and to form the groove of said metal channel into an endless groove which faces outwardly of said pattern:
   (e) interconnecting the opposite ends of said metal channel to form a rigid endless metal frame of irregular configuration:
   (f) removing said rigid endless metal frame from its position of conforming with the periphery of said pattern;
   (g) placing a sheet of flexible material on a holding fixture which is provided with means for demountably gripping the edges of said sheet so that it is held in a stretched planar attitude:
   (h) supporting said holding fixture on a support surface so that said sheet is in spaced parallel relationship with said supporting surface;
   (i) placing said rigid endless metal frame in juxtaposed bearing engagement with one of the planar surfaces of said sheet of flexible material held in said holding fixture;
   (j) exerting a force on said endless metal frame to holdingly deflect said sheet into contiguous engagement with said support surface to draw said sheet taut;
   (k) releasing the edges of said sheet from said holding fixture;
   (l) inserting the edges of said flexible sheet of material in the endless groove of said rigid endless metal frame; and
   (m) wedging an elongated spline into the endless groove of said rigid metal frame atop the edges of said flexible sheet of material, said spline having means which form an interference fit with the endless groove of said rigid metal frame upon insertion therein.

2. The method of claim 1 wherein said step of pressing said metal channel into conformity with the periphery of said pattern comprises the steps of:
   (a) anchoring one end of said metal channel in demountable bearing engagement with the peripheral edge of said pattern;
   (b) placing a force exerting means in bearing engagement with a portion of said metal channel with that engaged portion of said channel being adjacent the anchored end thereof and being disposed between said force exerting means and the peripheral edge of said pattern; and
   (c) moving said force exerting means about the periphery of said pattern so that said force exerting means moves along the length of said metal channel to press it into conformity with the peripheral surface of said pattern.

3. The method of claim 1 including the further step of demountably anchoring said pattern on a supporting surface prior to step d.

4. The method of claim 3 wherein said pattern is formed by a method which includes the steps of:
   (a) forming a planar pattern body of a nonmetallic material with said body configured with the desired irregular peripheral edge configuration;
   (b) forming at least two notches in the peripheral edge of said pattern body on substantially opposite sides thereof; and
   (c) assembling a different metal insert in each of said notches with said metal inserts including means for demountably anchoring said pattern on the supporting surface.

5. The method of claim 1 wherein said planar pattern includes a wooden pattern body.

6. The method of claim 1 wherein said planar pattern includes a wooden pattern body having means formed in the periphery thereof for receiving at least two metal corner inserts.

7. The method of claim 1 wherein the locations on said metal channel which are heated in step c are determined as those locations which are to be subjected in step d to forces which would distort said metal channel in the absence of said heating step.

8. The method of claim 1 wherein said step of pressing said metal channel into conformity with the periphery of said pattern comprises the steps of:
   (a) anchoring one end of said metal channel in demountable bearing engagement with the periphery of said pattern;
   (b) placing a force exerting means in bearing engagement with a portion of said metal channel with that engaged portion of said metal channel being adjacent the anchored end thereof and being disposed between the force exerting means and the periphery of said pattern; and
   (c) moving said pattern and said metal channel relative to said force exerting means so that the force exerted by said force exerting means is applied along the length of said metal channel to press it into conformity with the periphery of said pattern.

9. The method of claim 1 including the additional step of placing an adhesive in the endless groove of said metal frame prior to step l.

* * * * *